(12) United States Patent
Ragusa et al.

(10) Patent No.: US 7,953,779 B1
(45) Date of Patent: May 31, 2011

(54) CONFIGURATION REPRESENTATION AND MODELING USING CONFIGURATION SPACES

(75) Inventors: Jeffrey W. Ragusa, Austin, TX (US); Douglas Stephen Fearing, Austin, TX (US); Shawn A. P. Smith, Austin, TX (US); Andrew J. Maag, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 629 days.

(21) Appl. No.: 10/266,308

(22) Filed: Oct. 8, 2002

(51) Int. Cl.
*G06F 17/30* (2006.01)

(52) U.S. Cl. ............ 707/956; 707/999.003; 707/999.01; 707/999.102; 707/960; 707/962

(58) Field of Classification Search ....... 707/100–104.1, 707/203, 956, 960, 962, 999.01, 999.102; 700/97; 717/121, 104
See application file for complete search history.

(56) References Cited

U.S. PATENT DOCUMENTS

| | | | | |
|---|---|---|---|---|
| 5,206,949 A | * | 4/1993 | Cochran et al. | 707/4 |
| 5,267,156 A | * | 11/1993 | Nomiyama | 704/10 |
| 5,386,556 A | * | 1/1995 | Hedin et al. | 1/1 |
| 5,515,524 A |   | 5/1996 | Lynch et al. | 395/500 |
| 5,579,469 A | * | 11/1996 | Pike | 715/781 |
| 5,675,784 A | * | 10/1997 | Maxwell et al. | 707/100 |
| 5,696,916 A | * | 12/1997 | Yamazaki et al. | 715/853 |
| 5,708,798 A |   | 1/1998 | Lynch et al. | 395/500 |
| 5,734,907 A | * | 3/1998 | Jarossay et al. | 717/141 |
| 5,745,765 A | * | 4/1998 | Paseman | 717/107 |
| 5,825,651 A |   | 10/1998 | Gupta et al. | 364/468.09 |
| 5,844,554 A | * | 12/1998 | Geller et al. | 715/744 |
| 5,878,406 A | * | 3/1999 | Noyes | 706/55 |
| 5,963,953 A | * | 10/1999 | Cram et al. | 707/102 |
| 5,995,979 A | * | 11/1999 | Cochran | 707/104.1 |
| 5,996,114 A | * | 11/1999 | Moeller | 714/699 |
| 6,002,854 A | * | 12/1999 | Lynch et al. | 703/1 |
| 6,115,547 A | * | 9/2000 | Ghatate et al. | 703/13 |
| 6,182,062 B1 | * | 1/2001 | Fujisawa et al. | 1/1 |

(Continued)

OTHER PUBLICATIONS

An object model for evolutionary configuration management, Peltonen et al., pp. 1-18, 1993.*

*Primary Examiner* — Jean M Corrielus
(74) *Attorney, Agent, or Firm* — Hamilton & Terrile, LLP; Kent B. Chambers

(57) ABSTRACT

Configuration spaces facilitate the useful presentation of data, particularly configuration data used for representing configured products. Products include features and common features can be grouped by families. For example, an automobile can include a transmission family. The transmission family could include features such as automatic transmission and 4-speed manual transmission. Configuration spaces can be achieved by consolidating selected data without loosing useful information. The degree of consolidation achieved can be significant enough to permit display of data using conventional display technology. Configuration spaces break down the "universe" of possible configurations into constituent spaces defined by groups of rules for a selected feature. Common dependencies between the selected feature and related features can be consolidated to produce a more minimal form of the data used for representing the selected features and related features. Configuration spaces can provide a useful graphical view of the breakdown of all rules written for a single feature or multiple features. The data present in this view can be analyzed to, for example, study the dependency paths of an existing configuration and better understand the impact of revising configuration relationships. Thus, configuration spaces aid in the creation and modification of configuration models.

29 Claims, 16 Drawing Sheets

| | | | | |
|---|---|---|---|---|
| Market | USA | { ... } | | |
| Trim | XA | { ... } | XA | { ... } |
| ENG. v4 | O | M | O | S |

200

U.S. PATENT DOCUMENTS

| | | | |
|---|---|---|---|
| 6,256,773 B1 * | 7/2001 | Bowman-Amuah | 717/121 |
| 6,330,569 B1 * | 12/2001 | Baisley et al. | 1/1 |
| 6,405,308 B1 | 6/2002 | Gupta et al. | 713/1 |
| 6,519,588 B1 * | 2/2003 | Leschner | 1/1 |
| 6,651,063 B1 * | 11/2003 | Vorobiev | 707/10 |
| 6,675,294 B1 * | 1/2004 | Gupta et al. | 713/1 |
| 6,836,766 B1 * | 12/2004 | Gilpin et al. | 706/1 |
| 6,898,564 B1 * | 5/2005 | Odhner et al. | 703/21 |
| 6,965,895 B2 * | 11/2005 | Smith et al. | 707/10 |
| 6,973,626 B1 * | 12/2005 | Lahti et al. | 715/763 |
| 6,988,014 B2 * | 1/2006 | Kraemer et al. | 700/97 |
| 7,003,360 B1 * | 2/2006 | Dillon | 700/97 |
| 7,188,335 B1 * | 3/2007 | Darr et al. | 717/121 |
| 7,315,826 B1 * | 1/2008 | Guheen et al. | 705/7 |
| 2002/0010655 A1 * | 1/2002 | Kjallstrom | 705/27 |
| 2002/0099583 A1 * | 7/2002 | Matusek et al. | 705/7 |
| 2002/0165701 A1 * | 11/2002 | Lichtenberg et al. | 703/7 |
| 2002/0184111 A1 * | 12/2002 | Swanson | 705/26 |
| 2003/0055812 A1 * | 3/2003 | Williams et al. | 707/1 |
| 2003/0143653 A1 * | 7/2003 | McConnell et al. | 435/7.32 |
| 2003/0217252 A1 * | 11/2003 | Gupta et al. | 713/1 |
| 2004/0133572 A1 * | 7/2004 | Bailey et al. | 707/3 |
| 2005/0102318 A1 * | 5/2005 | Odhner et al. | 707/102 |

\* cited by examiner

| Market | USA | | | | Mexico | | | Canada | | | Europe | | | S.A. | | |
|---|---|---|---|---|---|---|---|---|---|---|---|---|---|---|---|---|
| Trim | XA | XB | XC | | XA | XB | XC | XA | XB | XC | XA | XB | XC | XA | XB | XC |
| ENG. v4 | O | M | M | | O | S | S | O | S | S | O | S | S | O | S | S |

*Figure 1 (Prior Art)*

| Market | USA | | |
|---|---|---|---|
| Trim | XA | {...} | {...} |
| ENG. v4 | O | M | S |
| | | XA | |
| | | O | |

| | TRMAC | | TRMAD | | TRMAE | |
|---|---|---|---|---|---|---|
| TRM | WHLAA E Long | WHLAB E Long | WHLAC E Long | WHLAB E Long | WHLAA E Long | WHLAB E Long | WHLAC E Long |
| WHL | | | | | | |
| BAA | M | S | S | S | S | S |
| BAAAA | | | | | S | S |

802

CONFIGURATION REPRESENTATION AND MODELING USING CONFIGURATION SPACES

BACKGROUND OF THE INVENTION

1. Field of the Invention

The present invention relates in general to the field of information processing, and more specifically to a system and method for representing and modeling the configuration of products.

2. Description of the Related Art

Configurable products can be described by sets of selectable features that make up the product. A feature represents an option that can be ordered on a product. For convenience, selectable features are generally grouped by families. Families are typically classified as groups of features with the same functional purpose. Example families for an automobile are "version," "trim package," "exterior package," "drives," "engines," "series," "tires," "markets," "wheels," "seats," and "transmissions." An example feature from the engines family is a "4.5 liter V8." Features relate to each other via configuration rules. A rule can be characterized as generally including a 'left hand side', (LHS), a 'right hand side' (RHS), and a specified relationship between the LHS and RHS. Each LHS feature may be associated with one or more RHS features, which indicates that a single feature in the LHS may be constrained or otherwise qualified by one or more RHS features. The RHS describes when a rule is in effect and what features are particularly affected. For example, a rule with a RHS of "XA, XB" means that, the rule is in effect in cases where you have at least XA and XB in a buildable configuration, and XA and XB are features particularly affected by the rule along with the LHS feature. Configuration rules include optionalities that define a relationship between the LHS and RHS. Example optionalities include "S," "O," and "N," which translate to "standard," "optional," and "not available," respectively. A specific example of a rule containing an optionality would be "the 4.5 liter V8 engine is standard on the XL trim." In general, a feature is related to another feature if a rule has been written for the selected feature that references another feature. For example, for the above rule, "4.5 liter V8 engine" forms the LHS, "XL trim" forms the RHS, and "standard" specifies the relationship between the LHS and RHS of the rule. The collection of product configuration rules is generally referred to as a product's configuration model.

As rules are developed to define valid product configurations, dependencies arise between various families and features of families. For example, the presence of a particular wheel in a product may depend upon the particular version of the product. A chain of dependencies often arise. For example, the choice of a particular wheel may depend upon the "version" and the "trim package" may depend upon the "transmission," and the "transmission" may depend on the "market," etc. Although a product may include many features, features are not related if there is no dependency path that defines a relationship. For example, there may be no relationship between the choice of a wheel and the choice of a transmission or seat.

It is often useful to select a particular feature of a configurable product and analyze all the other features that the selected feature depends upon in order to be part of a valid, i.e. buildable, configuration. For example, a user, such as a configuration modeler, may want to know what features of an automobile have a dependant relationship with a selected feature. Table 1 sets forth all the features of families that have a relationship to the Engine family on an example automobile:

TABLE 1

| Family | Features Relating to the Engine Family |
|---|---|
| Market | USA, Mexico, Canada, Europe, South America (S.A.) |
| Trim | XA, XB, XC |
| Engine | V4, V6 |

If a user would like to, for example, display the relationships between the V4 engine feature and features relating to the V4 engine, a grid could be displayed as in FIG. 1 that depicts the relationships between the selected V4 engine and the related families of Table 1 for the example automobile, e.g. the V4 engine is optional with Trim XA in the USA. The display of FIG. 1 is not particularly complicated and cumbersome.

However, as revealed in Table 2, when the number of related families and features increases displaying the relationships between features becomes very difficult when using normal sized displays, such as a 15-20 inch monitor. Table 2 sets forth the families and the number of features (the "feature count") therein that have a relationship to the wheel family of the example automobile.

TABLE 2

| Family | Feature Count |
|---|---|
| Version | 5 |
| Trim Package | 5 |
| Exterior Package | 5 |
| Drives | 2 |
| Engines | 6 |
| Series | 3 |
| Tires | 15 |
| Markets | 40 |
| Wheels | 12 |

The feature count in Table 2 represents 32,400,000 configuration combinations and resulting data cells. The explosion of the number of data cells stems from the fact that conventional configuration analytical methods produce all possible combinations of the dependent features. All these combinations are studied to ensure there are no overlaps and/or missing data for possible buildable product configurations. Viewing configurations, as in FIG. 1, presents an excellent way to permit a user to analyze feature relationships in a configuration model. However, once the number of combinations increases sufficiently to preclude normal viewing, visual analysis is precluded due to the user confusion caused by the amount of data represented.

SUMMARY OF THE INVENTION

In one embodiment, configuration spaces facilitate the useful presentation of data, particularly configuration data used for representing configured products. Configuration spaces can be achieved by consolidating selected data without losing useful information. The degree of consolidation achieved can be significant enough to permit display of data using conventional display technology.

In one embodiment of the present invention, a method of displaying configuration relationships of a product wherein families of product features are related to each other through dependencies comprises selecting one of the product features. The method also comprises displaying representations of the product features of one or more of the families that relate to the selected product feature, wherein the product features of a family that have common child dependencies are consolidated into a single representation.

In another embodiment of the present invention, a method of modeling a configuration of a product, wherein the product includes families of features, the method comprising selecting a feature of the product and selecting one or more additional features of the product. The method further comprises associating the additional features with the selected feature using one or more configuration rules and displaying a representation of the additional features organized in accordance with the configuration rules, wherein the additional features are grouped by family and organized into dependency relationships in accordance with the configuration rules, and additional features belonging to a common family and having common child-dependency paths are consolidated into respective feature superset representations.

In a further embodiment of the invention, a configuration space system comprises a model having a plurality of configuration rules, wherein each configuration rule relates a selected feature of a product to one or more additional features of the product via an optionality, wherein the product includes multiple families of features. The configuration space system further comprises a processing engine to determine dependency paths among the additional features and to display a representation of the additional features by family, wherein the product features of a family that have common child dependencies are consolidated into a single representation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 (prior art) depicts a grid containing relationships between features of an automobile.

FIG. 2 depicts a configuration space concisely representing the relationships depicted in FIG. 1.

FIGS. 6-10 depict an example modeling task performed by the modeling tool of FIG. 5.

DETAILED DESCRIPTION

The term "product" is used herein to generically refer to tangible products, such as systems, as well as intangible products, such as services.

Technology referred to herein as "configuration spaces" has been developed to facilitate the useful presentation and modeling of data, particularly configuration data used for representing configured products. Configuration spaces can be achieved by consolidating selected data. The degree of consolidation achieved can be significant enough to permit display of data using conventional display technology.

Configuration spaces break down the "universe" of possible configurations into constituent spaces defined by groups of rules for a selected feature. Common dependencies between the selected feature and related features can be consolidated to produce a more minimal form of the data used for representing the selected features and the related features. Configuration spaces can provide a useful graphical view of the breakdown of all rules written for a single feature or multiple features. The data present in this view can be analyzed to, for example, study the dependency paths of an existing configuration and better understand the impact of revising configuration relationships. Configuration space representation can provide tremendous advantages over conventional representations by, for example, reducing the number of columns of data that a user sees as well as preserving the way the user enters rules on grids without any "extra" qualifiers. This should lessen confusion or opportunities for misunderstanding of the represented data between the user intent and the system rules. Thus, configuration spaces aid in the creation and modification of configuration models.

Before describing the creation of configuration spaces, an example graphical display of a configuration space 200 is depicted in FIG. 2 to provide general context for the subsequent description. An analysis of FIG. 1 reveals that several families and features have common child dependencies. Configuration space 200 exploits this commonality by consolidating features that have common child dependencies. FIG. 2 depicts consolidated features with bracketed ellipses, i.e. "{ . . . }". Consolidating features having common child dependencies results in a more minimal representation of the configuration relationships between the families in Table 1 and the V4 engine. From a typical modeler's perspective, such consolidation does not sacrifice information useful in analyzing the configuration model and subsequent modifications. Furthermore in this embodiment, configuration space 200 efficiently limits the amount of data displayed by only providing data on features related within a configuration model to the selected feature.

Figure 3:
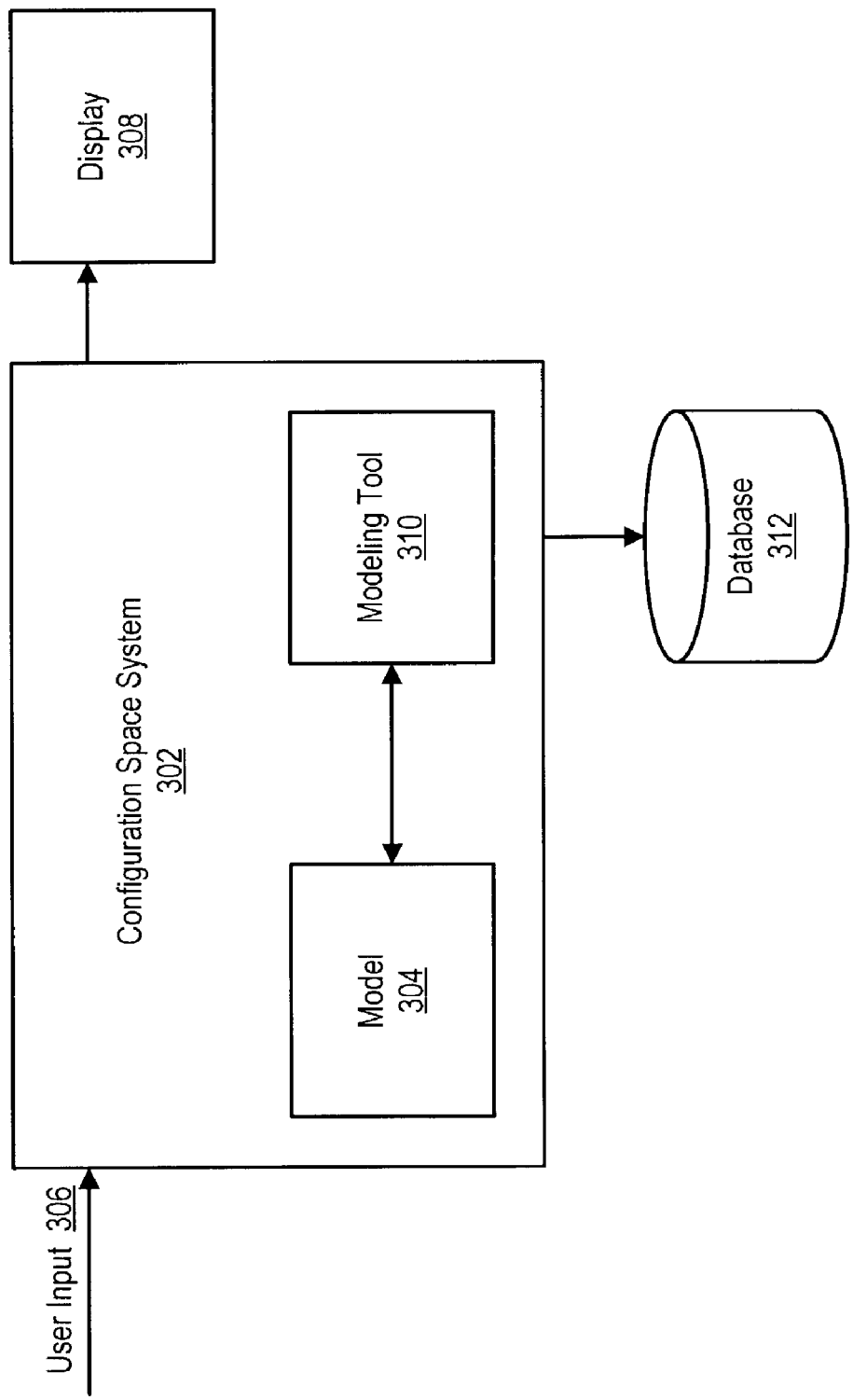
FIG. 3 depicts a configuration space system.

Referring to FIG. 3, a configuration space system 302 includes a modeling tool 310 having read/write access to configuration model 304. The configuration space system 302 can be used to visually interpret configuration model 304, generate configuration model 304, and modify configuration model 304 in accordance with user input 306. Configuration space system 302 displays a configuration space and user tools using display 308, which may be a monitor, projector, or other display device.

Modeling tool 310 allows a user to revise, create and otherwise generate configuration model 304. Modeling tool 310 can use data entered directly by a user or selected by a user from a database 312. A more detailed description of modeling tool 310 is presented below. Configuration space system 302 may be implemented, for example, using software and hardware to execute the software and access the stored data of model 304.

Figure 4:
FIG. 4 depicts a configuration space.

FIG. 4 depicts configuration space 400 which displays the relationship between selected feature FE and features of the related families. Table 3 contains the rules that define the relationships. In Table 3, features are designated by 2 letter combinations with the first letter in the combination being the family designation, i.e., feature "XY" is from the family "X". For example, suppose configuration model 400, an embodiment of configuration model 304, includes 20 families, A through T, in a product. Suppose further that a user selects feature E from family F (referred to as "FE") and desires to see the universe of features that FE relates to in a valid configuration. As shown in Table 3, the selected feature FE is related to families A through E because families A through E all have features on the RHS of rules that have FE on the LHS. Table 4 contains a key to the symbols used in Table 3.

TABLE 3

Rule Representation for Selected Feature "FE"

| | Selected Feature (LHS) | Optionality | Related Features (RHS) | | | | |
|---|---|---|---|---|---|---|---|
| 1. | FE | — | AA | ~{BA} | | | |
| 2. | FE | S | AB | BA | | | |
| 3. | FE | — | ~{AA, AB} | | | | |
| 4. | FE | S | AB | BZ | CD | DF | |
| 5. | FE | — | AB | ~{BA, BZ} | | | |
| 6. | FE | — | AB | BZ | ~{CD} | | |
| 7. | FE | — | AB | BZ | CD | ~{DF} | |
| 8. | FE | N | AA | BA | CE | DC | EF |
| 9. | FE | O | AA | BA | ~{CE} | | |
| 10. | FE | O | AA | BA | CE | DC | ~{EF} |
| 11. | FE | N | AA | BA | CE | DH | EF |
| 12. | FE | O | AA | BA | CE | DH | ~{EF} |
| 13. | FE | N | AA | BA | CE | DJ | EF |
| 14. | FE | O | AA | BA | CE | ~{DC, DH, DJ} | |
| 15. | FE | O | AA | BA | CE | DJ | ~{EF} |

TABLE 4

KEY to TABLE 3

| Optionality | |
|---|---|
| S | Standard |
| — | No rule |
| N | Restricted |
| O | Optional Feature |
| ~ {"contents"} | A feature set that includes every feature in a family except the "contents" This consolidated feature set may also be referred to as a "polar set". |

From Table 3 it can be seen that family A occurs most frequently followed by B, C, D, and E, in that order. In general, the display of configuration space 400 can be minimized by placing families occurring more frequently on the RHS of rules at a higher level since Family A occurs most frequently, Family A is positioned at the highest level. In a tree depiction, Family A would be at the root node and the optionalities would be at the leaf node. Note that the rules in Table 3 include consolidated features represented by negative sets, i.e. the set of all features 'not' contained in the brackets. Consolidated features may be represented in other ways, such as positive sets.

The rules in Table 3 are arranged for convenience to easily show the dependency paths in configuration space 400. Each row in Table 3 illustrates a complete dependency path with the selected feature FE being the leaf (i.e. at the end or lowest level) of all dependency paths. As described above, features in a family with common child dependency paths may be consolidated to minimize representation. Configuration space 400 represents maximum consolidation because all the dependency paths are unique. It will be clear to those of ordinary skill in the art that configuration space 400 could be displayed in any number of ways. For example, the cells depicted in configuration space 400 could be replaced by nodes in a hierarchical graph or tree.

Figure 5:
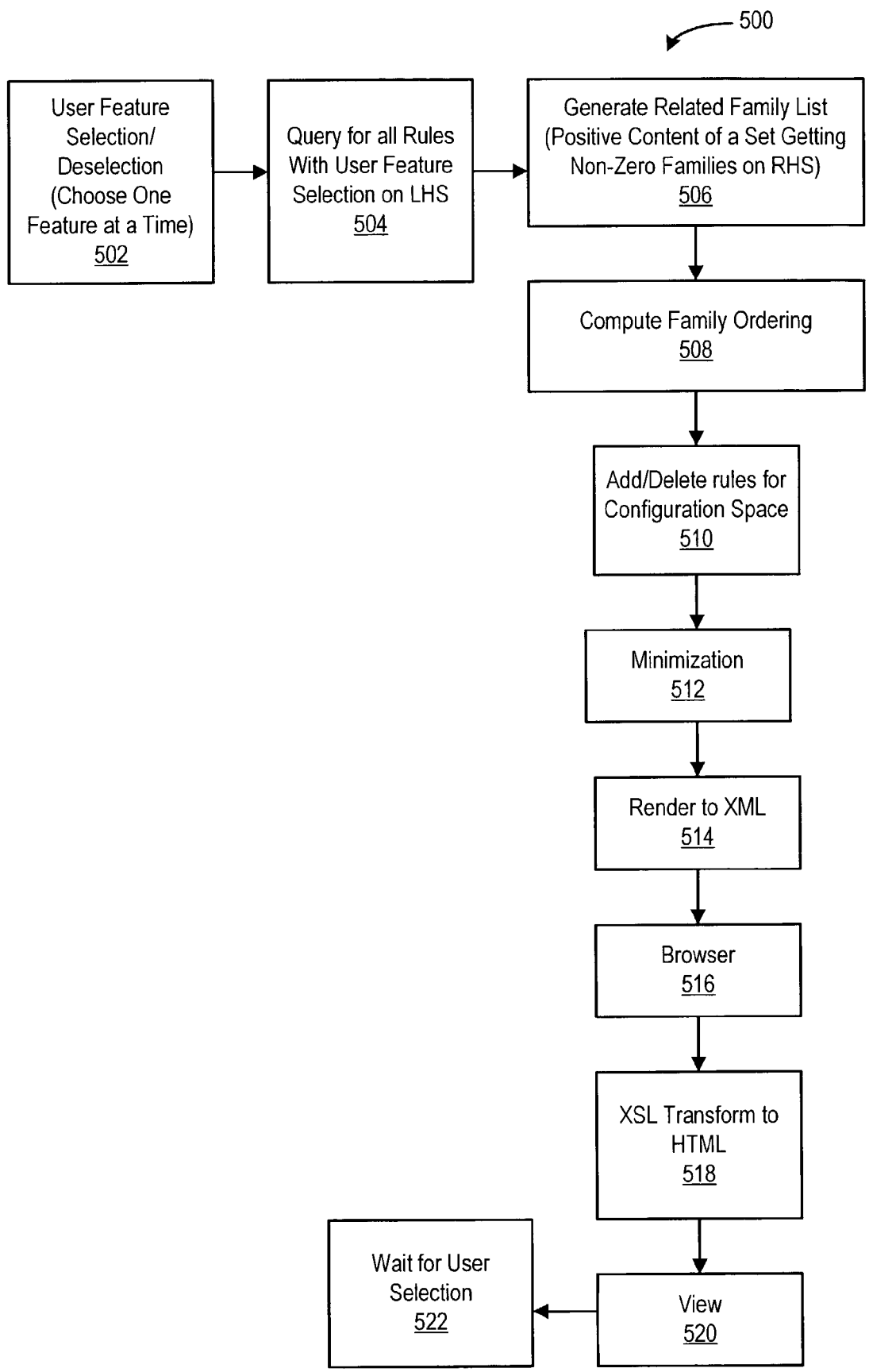
FIG. 5 depicts operations of an embodiment of a modeling tool that implements a configuration space representation and modeling process and a modeling tool interface.
Figure 6:
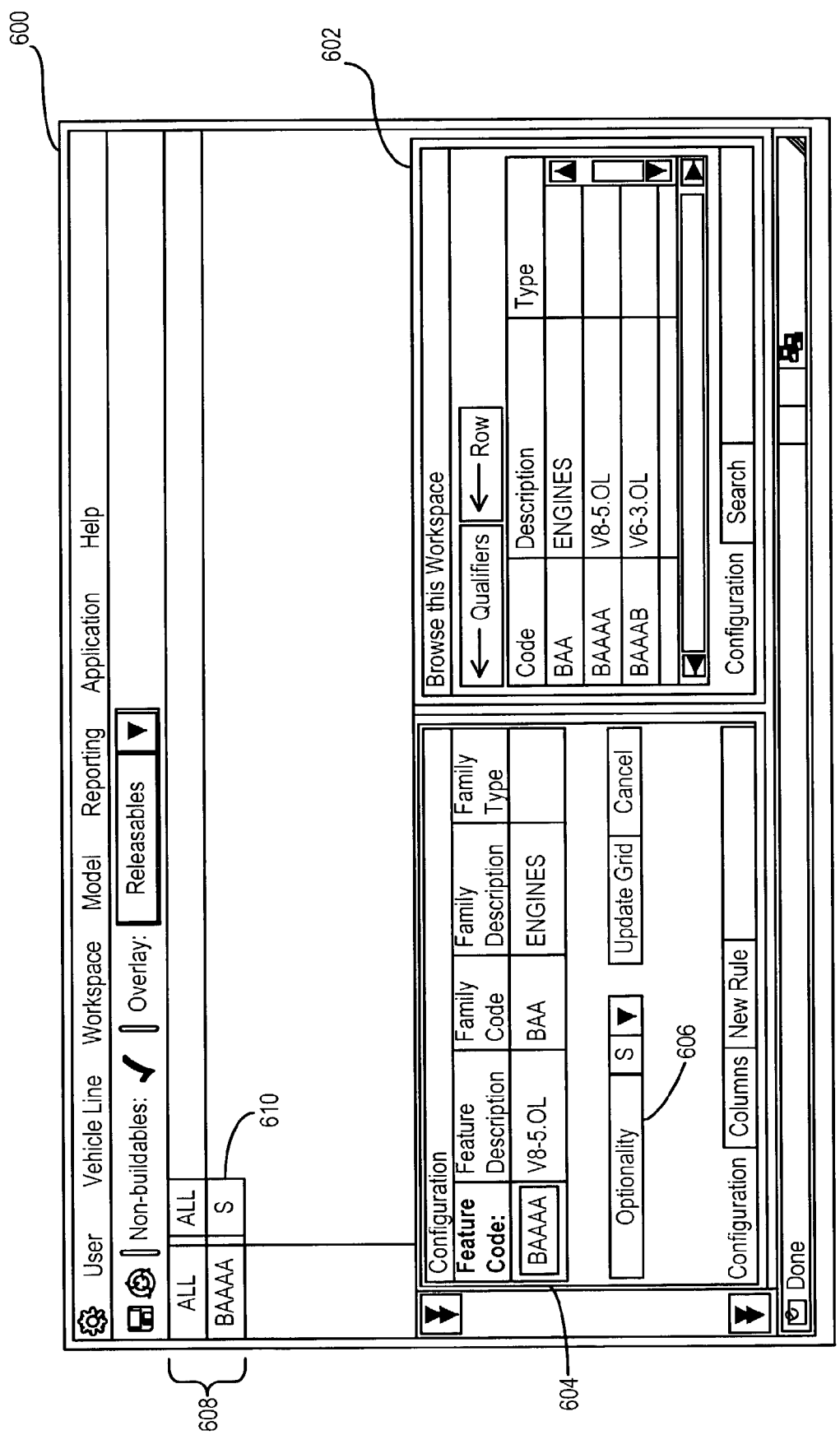

FIG. 5 depicts the operations of an embodiment of modeling tool 310 that implements configuration space representation and modeling process 500 and modeling tool interface 600 (FIG. 6). Process 500 will be illustrated with an example modeling task described below in conjunction with FIGS. 6-10. In the example, the product is an automobile and the selected feature is an engine referenced by the symbol BAAAA. The example will illustrate the creation of an embodiment of a configuration space centered upon the selection of an engine and the features and families that the selected engine depends upon to be part of a valid configuration of the automobile. This example assumes that configuration model 304 initially contains no rules.

As discussed above, in one embodiment configuration spaces provide a way of displaying product features that are related to a selected feature via the RHS and LHS of rules, respectively. Operation 502 is used to initially select the LHS 'selected feature', to add qualifying features (RHS), to modify qualifying features, and to select optionalities to relate the selected feature and qualifying features. In operation 502, a user selects a feature or deselects a previously selected feature. In one embodiment, the optionalities associated with each dependency path will be at the lowest level of a dependency path for a product configuration. Referring to FIG. 6, modeling tool interface 600 includes a find feature window 602 that is populated with data from database 312. Features in the find feature window 602 can be selected as "qualifiers" or "qualifying features" of the selected feature. A feature is a qualifier when it is in the dependency chain of the selected feature, e.g. is on the RHS of a configuration rule with the selected feature being on the LHS.

Referring to FIG. 5 and FIG. 6, to initiate modeling and generation of a configuration space based on a particular selected feature a user initially selects the LHS feature. In the embodiment of configuration space 608, the user selects BAAAA, a 5.0 L V8 engine, from find feature window 602 as the selected feature. BAAAA is then displayed as the Feature Code in feature window 604. In one embodiment of process 500, the initial default is BAAAA on the LHS with ALL being standard, which equates to adding Rule 1 to an embodiment of configuration model 304. Thus, modeling tool 310 is used, in one embodiment, to create rules embodied in configuration model 304.

BAAAA S ALL Rule 1.

"ALL" on the RHS equates to the absence of any qualifiers (i.e. the RHS is empty in Rule 1), and a RHS of ALL means that Rule 1 is in effect in all cases. In other words, there is no defined dependency between BAAAA and any one family, and, thus, you have at least "nothing" in a buildable configuration. The appearance of "ALL" on the RHS of a rule represents an empty set of qualifiers. In one embodiment, the use of "ALL" is "S" no matter what else is in the product. Although this may initially seem counter-intuitive, by looking at the configuration space 608 the ALL space is the initial universe of RHS features, which contains "nothing," and the universe is subsequently populated by additional rules. Configuration space 608 represents one embodiment of configuration model 304. Configuration space 608 is depicted as a table. It will be understood by those of ordinary skill in the art that there are a myriad of ways to display configuration space 608 without departing from the teachings herein. For example, rather than display as a table, configuration space 608 could be displayed in a circular graph with levels emanating from the center or from the perimeter. The configuration space 608 could also, for example, be displayed as a traditional tree with consolidated nodes.

To begin generation of configuration space 608, operation 504 queries for all rules with BAAAA on the left hand side. In this example, Rule 1 is the only existing rule in configuration model 304 with BAAAA on the left hand side. Operation 506 generates the related family list. No families are related to BAAAA as evidenced by "All" (an empty set) being present on the RHS of Rule 1.

Operations 506-512 focus primarily on generating information that makes rendering of configuration space 608 possible. Since only one rule exists at this point, Rule 1, generation of configuration space 608 is relatively straightforward. However, the discussion below will also apply to more complicated instances involving multiple rules. In operation 508, family ordering is computed, which is one optional technique for minimizing the data representation of configuration space 608. The technique reviews the frequency that a feature occurs on the RHS in all rules in the configuration model 304 represented by configuration space 608. The more often a feature occurs on the RHS, the feature's family will appear closer to the root node in the dependency path depicted by the configuration space. In configuration space 608, a family occurring higher in the dependency path would be represented by a higher row.

Operation 510 ensures that all rules will be added to the configuration space 608. Adding rules to the configuration space 608 involves splitting the configuration space 608 when a new rule is added that includes on the RHS a feature of a family already present in the configuration space 608. When a rule is added that includes a feature of a family that is not already present in the configuration space 608 operation 510 adds a layer to configuration space 608. Operation 510 can also remove rules that are selected by a user for deletion. The configuration space 608 is then appropriately reconfigured to display accurate dependency paths.

It may be desirable to further optimize the display of configuration space 608 by minimizing the data representation of configuration space 608. If further minimization is desired, process 500 also includes operation 512. In one embodiment, operation 512 a trie data structure (also referred to as a "trie") is generated. The description of the trie data structure and associated minimization operations are presented below in conjunction with FIGS. 11-15.

In one embodiment, process 500 performs family ordering and minimization operations 508 and 512, respectively, on an 'as requested' basis rather than during each pass through process 500. For example, in one embodiment, by selecting the 'Columns' tab in FIG. 6, a user can manually rearrange family ordering. In another embodiment, a user can request process 500 to perform operations 508 and/or 512.

Operations 514-518 assume that the configuration space 608 will be displayed by a software application that interprets and renders hypertext mark-up language (HTML), such as a web browser. It will be understood by those of ordinary skill in the art that any other data format compatible with the configuration space system 302 and display 308 can be used to display configuration space 608. In operation 514, tags and display criteria are used to format the data acquired through operation 512 into an extensible mark-up language (XML) document. Note, as rules and families are added, the dependency paths depicted by configuration space 608 will split and grow, respectively. Thus, it is preferable to track each node and cell in the dependency path to assist in accurately portraying the configuration space 608 using XML. One way to render the into XML is to use a breadth-first order traversal of the trie and render each node as it is visited. The resulting XML is then well suited for display in a table-like structure. The XML document and a corresponding XML stylesheet (XSL) are transmitted to an Internet browser application, such as Internet Explorer 5.0 or greater or Netscape 6.0 or greater. In operation 518, in a well-known manner, the browser utilizes the XSL to transform the XML document into an HTML document that will display the configuration space 608. In operation 520, configuration space 608 can be viewed, for example by displaying on a computer system monitor. Operation 522 waits for the next user selection before returning process 500 to operation 502.

Figure 7:
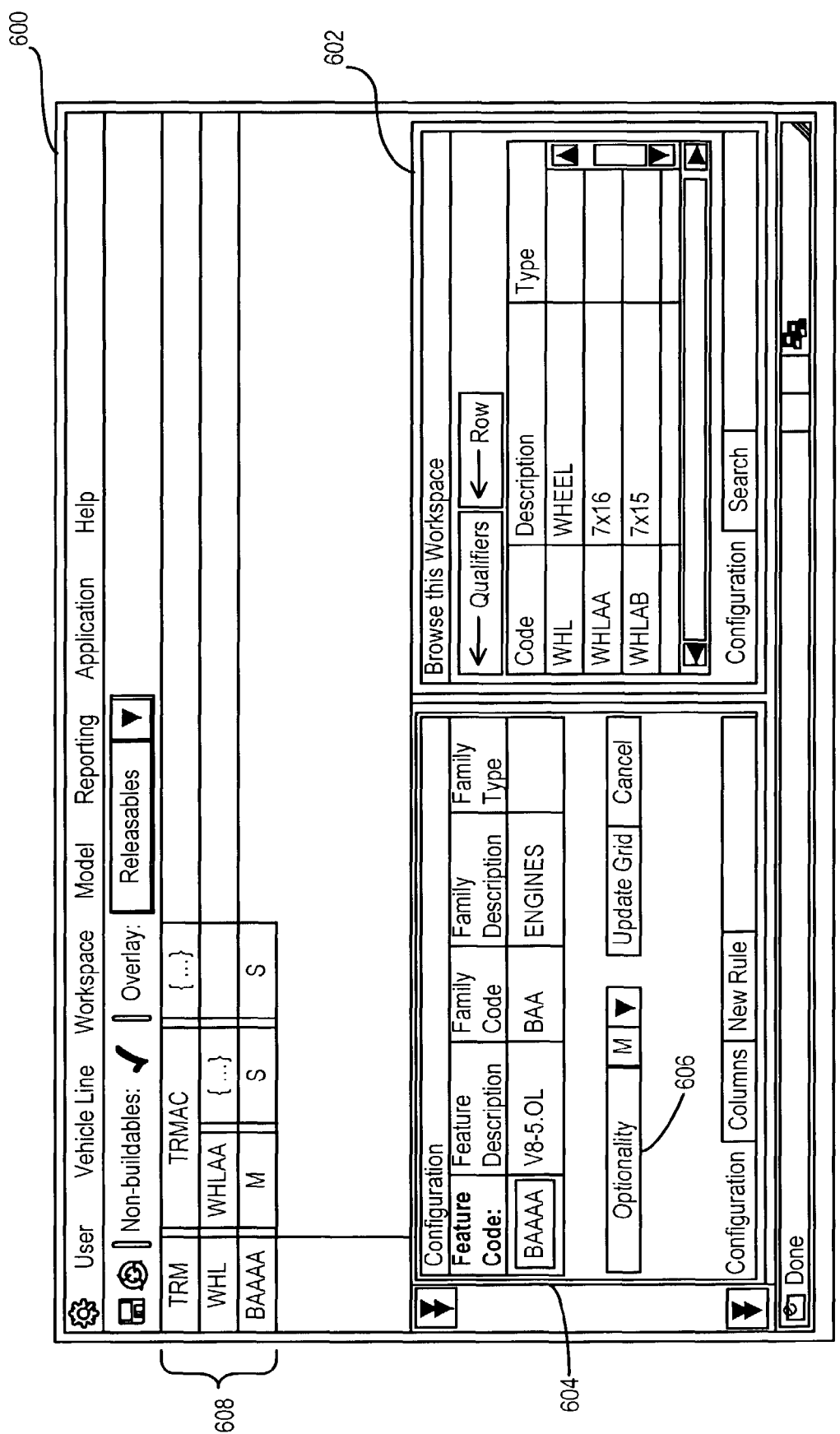

Modeling continues through the creation of new rules or the modification of existing rules. Referring to FIG. 7, two families are sequentially introduced into the configuration model 304. In one embodiment, for each product the number of features in a family is predetermined by the user and can be any amount. Family "TRM" is a family of trims, such as Limited and Standard. Family "WHL" is a family of wheels having a predetermined number of wheels.

In the find feature window 602, the family WHL is displayed by modeling tool interface 600 along with a subset of available features, WHLAA and WHLAB. In operation 502, the user selects WHLAA and then selects TRMAC, which can be located by scrolling through find feature window 602. An optionality is selected by scrolling through optionality window 606. Example optionalities are shown in Table 4. "M," mandatory, is shown as selected. The modeling tool 310 then creates a rule with the selected feature on the LHS, the selected qualifiers on the RHS, and an optionality to relate the RHS and LHS. Thus, by selecting WHLAA and TRMAC and optionality "M," Rule 2 is created and added to an embodiment of configuration model 304. By selecting "New Rule" tab, modeling tool 310 would display the new rule as Rule 2, shown below:

BAAAA M TRMAC, WHLAA Rule 2.

In one embodiment, configuration space system 302 also includes technology to determine conflicts in rules, in configuration model 304 when a new rule is added. As a side effect to avoid overlapping rules, Rule 1 is deleted and replaced by Rules 3 and 4 are added. Rule 3 indicates that feature BAAAA is standard with the set of all trim packages in the TRM family except for TRMAC. Rule 4 indicates that BAAAA is standard with TRMAC when combined with any WHL family feature except WHLAA.

In the embodiment of configuration space 608, the ALL row is not shown to conserve space, but nevertheless the configuration space 608, in one embodiment, represents all rules involving BAAAA (or any selected LHS feature).

Thus, the current set of rules in configuration model 304 includes Rules 2-4.
BAAAA M TRMAC, WHLAA Rule 2.
BAAAA S ~{TRMAC} Rule 3.
BAAAA S TRMAC, ~{WHLAA} Rule 4.

Operation 504 queries for all rules with BAAAA on the LHS. Rules 2-4 meet the query criteria. In operation 506, the related family list consists of families TRM and WHL. In operation 508, the TRM family occurs most frequently, so TRM is placed at the root level, a higher level than the WHL family. Operation 510 adds Rules 2-4 to configuration space 608 and deletes Rule 1. Operation 512 examines a trie data structure that represents Rules 2-4 and minimizes the configuration space 608 by combining parent nodes having common sub-trees. Operations 514-518 render the configuration space 608 into a viewable HTML document in the manner described above so that the configuration space 608 can be viewed in operation 520.

Referring to FIG. 8, a full grid 802 can be displayed to show all combinations of families in the example configuration. Note that grid 802 occupies substantially more screen area than a comparably sized configuration space 608, yet configuration space 608 displays the equivalent information.

Figure 9:
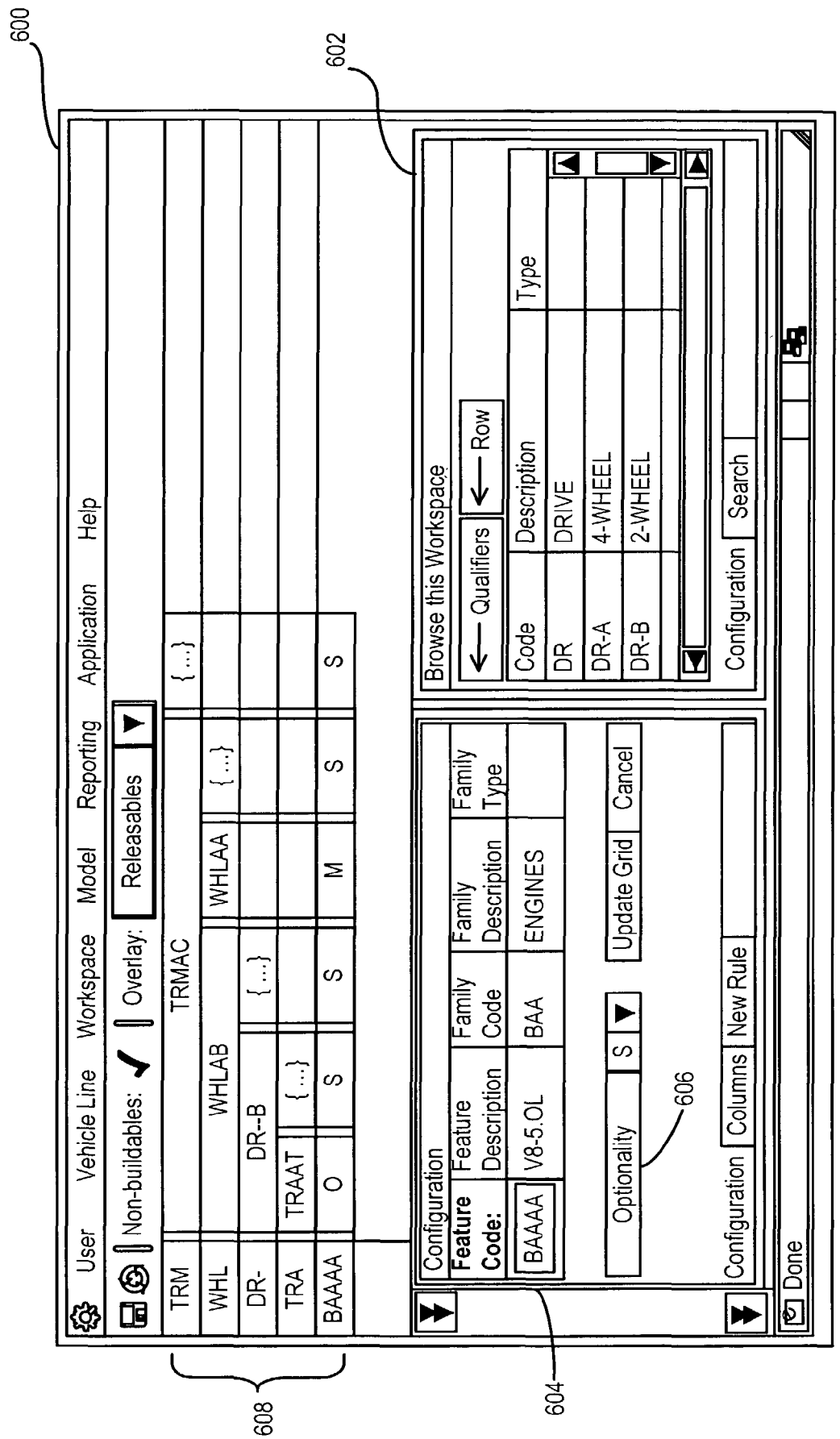

Referring to FIG. 9, two more families are sequentially introduced into the configuration model 304. Family "DR" is a family of drives, such as 2-wheel and 4-wheel drive. Family "TRA" is a family of transmissions, such as automatic and 4-speed manual.

In the find feature window 602, the families and features are located and selected in operation 502. Optionalities are associated between the selected feature and selected qualifying features. Suppose the user desires to create an additional rule in configuration model 304 indicating that BAAAA is optional with the combination of features TRMAC, WHLAB, DR-B, and TRAAT. As discussed above, the user selects qualifying features TRMAC, WHLAB, DR-B, and TRAAT from find feature window 602 and selects an optionality to relate the selected qualifying features with BAAAA. Such a rule is represented by Rule 5.

BAAAA O TRMAC, WHLAB, DR-B, TRAAT Rule 5.

As a side effect (to avoid rule overlap), Rule 4 is deleted and replaced by Rules 6, 7, and 8. Rule 6 indicates that BAAAA is standard with feature TRMAC and all wheels except WHLAA and WHLAB. Rule 7 and 8 respectively indicate that BAAAA is standard (S) with TRMAC, WHLAB, and all drives except DR-B and BAAAA is standard with TRMAC, WHLAB, DR-B, and all transmissions except TRAAT.

BAAAA S TRMAC, ~{WHLAA, WHLAB} Rule 6.
BAAAA S TRMAC, WHLAB, ~{DR-B} Rule 7.
BAAAA S TRMAC, WHLAB, DR-B, ~{TRAAT} Rule 8.

Therefore the current set of BAAAA rules in the configuration model 304 are:
BAAAA M TRMAC, WHLAA Rule 2.
BAAAA S ~{TRMAC} Rule 3.
BAAAA O TRMAC, WHLAB, DR-B, TRAAT Rule 5.
BAAAA S TRMAC, ~{WHLAA, WHLAB} Rule 6.
BAAAA S TRMAC, WHLAB, ~{DR-B} Rule 7.
BAAAA S TRMAC, WHLAB, DR-B, ~{TRAAT} Rule 8.

Operation 504 queries for all rules with BAAAA on the LHS. Rules 2, 3, and 5-8 meet the query criteria. In operation 506, the related family list consists of families TRM, WHL, DR, and TRA. In operation 508, the TRM family occurs most frequently, so TRM is placed at the root level, followed by the WHL, DR, and TRA families. Operation 510 adds Rules 5-8 to configuration space 608 and deletes Rule 4. Operation 512 examines a trie that represents Rules 2, 3, and 5-8 and minimizes the configuration space 608 by combining parent nodes having common sub-trees. Operations 514-518 render the configuration space 608 into a viewable HTML document in the manner described above so that the configuration space 608 can be viewed in operation 520.

Figure 10:
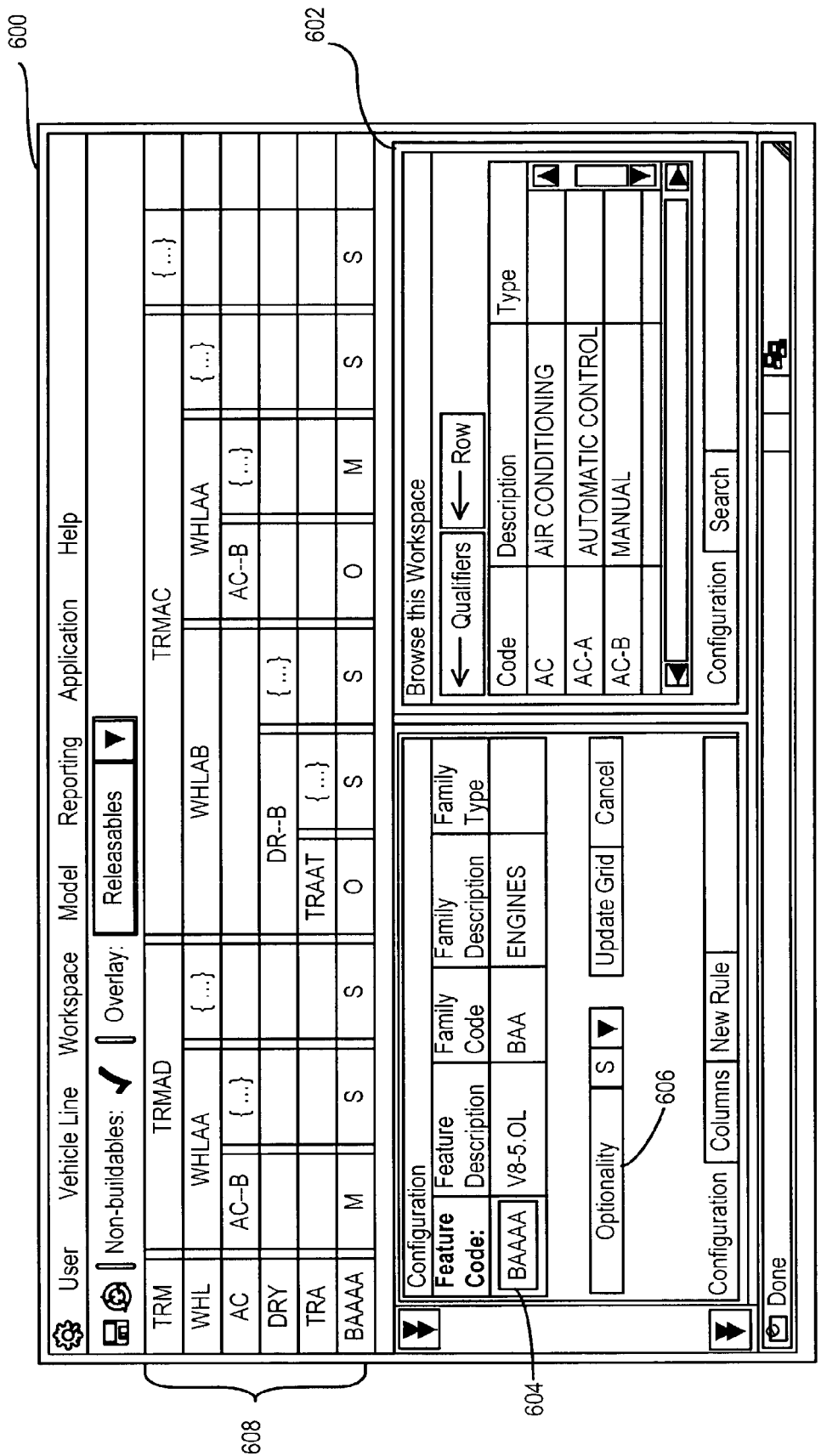

Referring to FIG. 10, the "AC," air conditioning, family is introduced into the configuration model 304. In the find feature window 602, the AC family and features are located and selected in operation 502. Suppose the user desires to create two rules in configuration model 304. The first rule indicates that BAAAA is optional with the combination of qualifying features TRMAC, WHLAA, and AC-B. As discussed above, the qualifying features are selected from find feature window 602. The optionality to relate the selected qualifying features to BAAAA is selected from optionality window 606 to create a rule. Such a rule is represented by Rule 9.

BAAAA O TRMAC, WHLAA, AC-B Rule 9.

As a side effect (to avoid rule overlap), Rule 2 is deleted and replaced by Rule 10. Rule 10 indicates that BAAAA is mandatory with features TRMAC, WHLAA, and all features of family AC except AC-B.

BAAAA M TRMAC, WHLAA, ~{AC-B} Rule 10.

Rule 11 represents the second added rule referred to above, which indicates the BAAAA is mandatory with the combination of features TRMAD, WHLAA, and AC-B.

BAAAA M TRMAD, WHLAA, AC-B Rule 11.

As a side effect (to avoid rule overlap), Rule 3 is deleted and replaced by Rules 12-14. Rule 12 indicates that BAAAA is standard with all transmissions in the TRM family except TRMAC and TRMAD. Rule 13 indicates that BAAAA is standard with the combination of transmission TRMAD and all wheel features in family WHL except wheel WHLAA. Rule 14 indicates that BAAAA is standard with all combinations having features TRMAD and WHLAA and not having feature AC-B.

BAAAA S ~{TRMAC, TRMAD} Rule 12.
BAAAA S TRMAD, ~{WHLAA} Rule 13.
BAAAA S TRMAD, WHLAA, ~{AC-B} Rule 14.

Therefore the current set of BAAAA rules in the configuration model 304 are:
BAAAA O TRMAC, WHLAB, DR-B, TRAAT Rule 5.
BAAAA S TRMAC, ~{WHLAA, WHLAB} Rule 6.
BAAAA S TRMAC, WHLAB, ~{DR-B} Rule 7.
BAAAA S TRMAC, WHLAB, DR-B, ~{TRAAT} Rule 8.
BAAAA O TRMAC, WHLAA, AC-B Rule 9.
BAAAA M TRMAC, WHLAA, ~{AC-B} Rule 10.
BAAAA M TRMAD, WHLAA, AC-B Rule 11.
BAAAA S ~{TRMAC, TRMAD} Rule 12.
BAAAA S TRMAD, ~{WHLAA} Rule 13.
BAAAA S TRMAD, WHLAA, ~{AC-B} Rule 14.

Operation 504 queries for all rules with BAAAA on the LHS. Rules 5-14 meet the query criteria. In operation 506, the related family list consists of families TRM, WHL, AC, DR, and TRA. In operation 508, the TRM family occurs most frequently, so TRM is placed at the root level, followed by the WHL, AC, DR, and TRA families. Operation 510 adds Rules 9-14 to configuration space 608 and deletes Rules 2 and 3. Operation 512 examines a trie that represents Rules 5-14 and minimizes the configuration space 608 by combining parent nodes having common sub-trees. Operations 514-518 render the configuration space 608 into a viewable HTML document in the manner described above so that the configuration space 608 can be viewed in operation 520.

Figure 11:
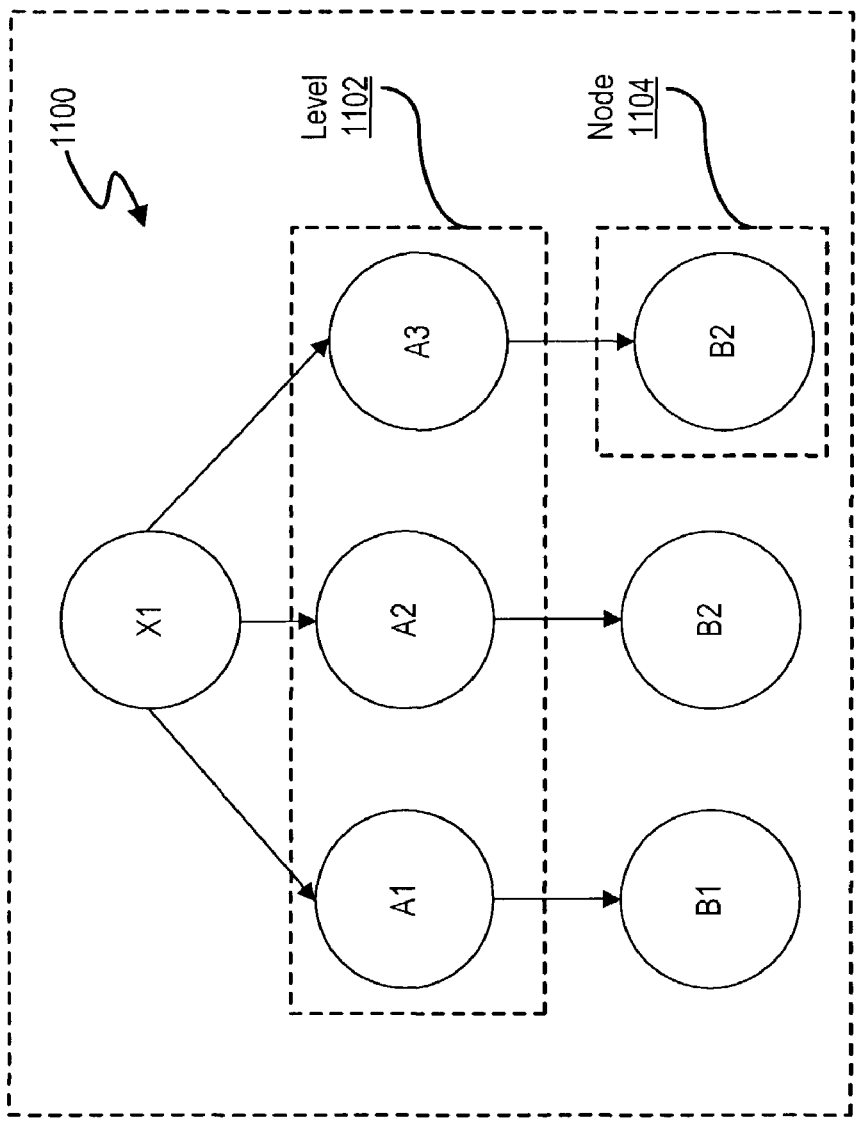
FIG. 11 depicts a trie data structure.

Referring to FIG. 11, a trie data structure 1100, or trie, extends the typical ordered binary decision tree data structure. The ordered binary decision tree is a tree data structure with nodes at each tree level connected by edges. The levels of the tree represent a single binary variable and are ordered in a known manner. The nodes at each level represent the value of the variable (either 1 or 0). The ordered binary decision tree can be used to evaluate whether a particular conclusion can be reached based on the presence of a path through the tree that matches certain provided input criteria (typically, one or several of the variables with an assigned binary value).

Whereas the ordered binary decision tree assigns a binary variable to a level and a binary value to a node, the trie data structure assigns a multi-valued variable to a level and a binary set to each node. In one embodiment such as an automotive configuration space context, the trie has special meaning: each level 1102 of the trie is a family, the nodes 1104 of the level are sets of features within this family, each feature (i.e. member of the set X1, A1, A2, A3, B1, and B2) can assume a binary value, and the trie 1100 as a whole represents the optionalities and RHS features of rules having a LHS feature, F.

The trie data structure represents the value of the variable at each node through the values of the features in the set at that node. The value of the variable at each node and through all levels of the trie communicate the value of the trie. In one embodiment of an automotive configuration space context, the value of the trie can be thought of as all possible buildable configurations that include LHS feature F for the vehicle product the trie represents. Unlike other typical automotive configuration approaches, the trie represents the entire space of possible buildable configurations for an automotive vehicle line in a manner optimized for searching as opposed to representing configuration rules between particular features.

Assuming B level represents optionalities with B1=optional and B2=standard, trie 1100 represents the following buildable configurations as represented by paths trie 1100:

{F, X1, A1}, {F, X1, A2}, {F, X1, A3}

These buildable configurations might be expressed by the following configuration rules:

| F | B1 | X1, A1 |
| F | B2 | X1, A2 |
| F | B2 | X1, A3 |

Figure 12:
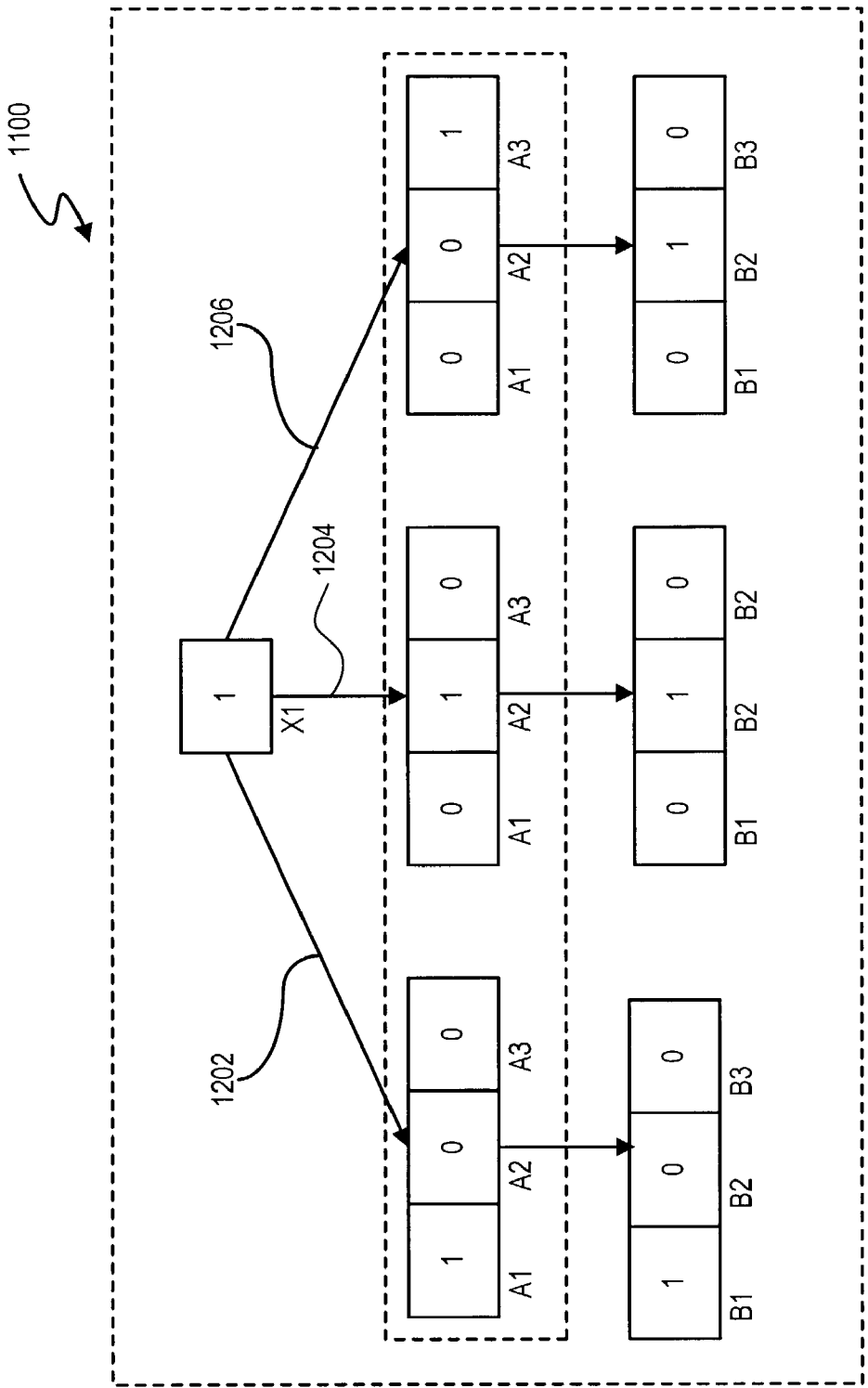
FIG. 12 depicts a trie data structure in binary form.

In one embodiment, the binary form of trie 1100 uses one bit per feature. A known family and feature ordering of the bits, a known number of bits per family, and a value of each bit can completely define each trie. For example, FIG. 12 represents trie 1100 in its binary form. Since family X has only one feature, it is represented by a single bit, with 1=present and 0=absent. Family A has 3 features, B1, B2, and B3; B1=optional, B2=standard, and B3=mandatory. Thus, branch 1202 is represented by the binary sequence 1100100, with the most significant bit representing the X family, the next 3 most significant bits representing the A family, and the 3 least significant bits representing the B family. Accordingly, branch 1204 is represented by the binary sequence 1010010, and branch 1206 is represented by the binary sequence 1001010. It will be evident to those of ordinary skill in the art that other coding schemes may be used to define a trie.

Figure 13:
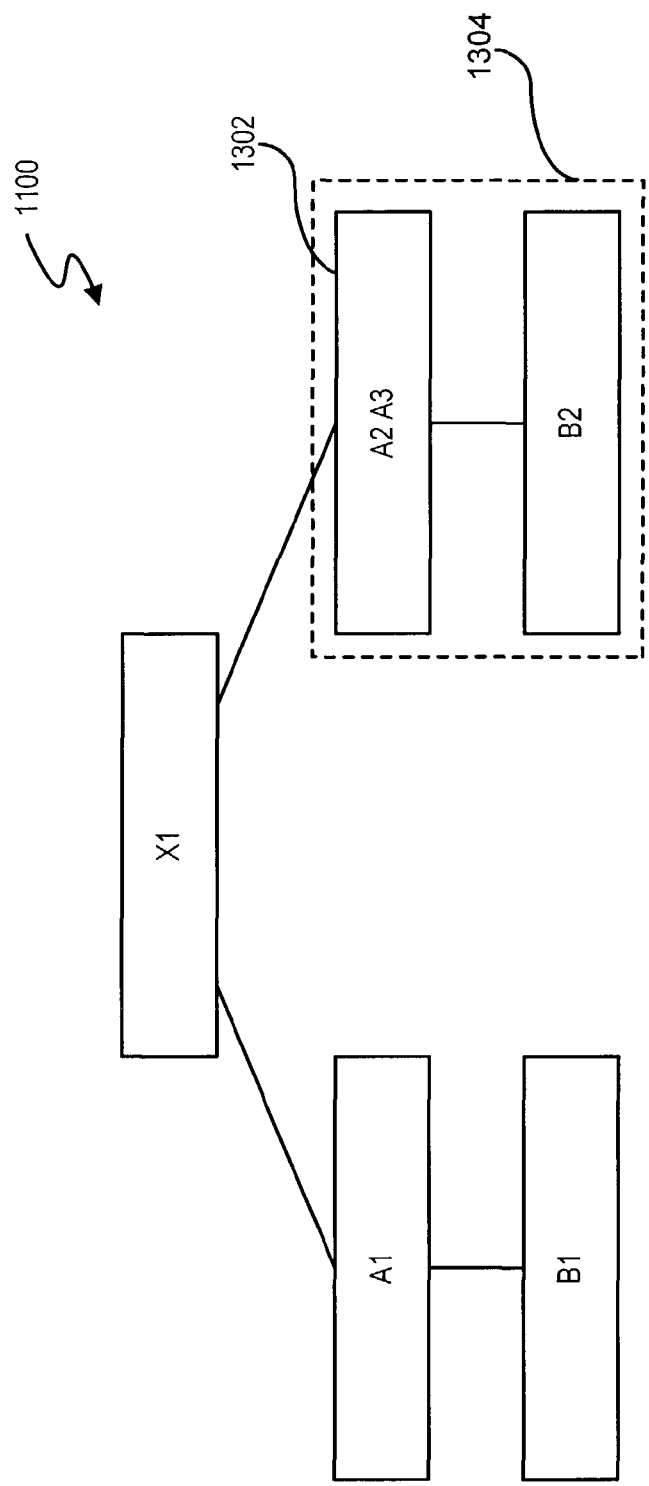
FIG. 13 depicts a trie data structure with consolidated nodes.

A trie can be minimized when a parent node has child nodes that are roots of identical sub-tries, a sub-trie being the trie beginning from an intermediate node. The sibling nodes with identical sub-tries can be combined into a single node, and the independent paths can be combined into a single path. In our example, the independent nodes {A2} and {A3} and paths {A2}-{B2} and {A3}-{B2} became a consolidated node {A2, A3} 1302 and a reduced path {A2, A3}-{B2} 1304 as depicted in FIG. 13.

Figure 14:
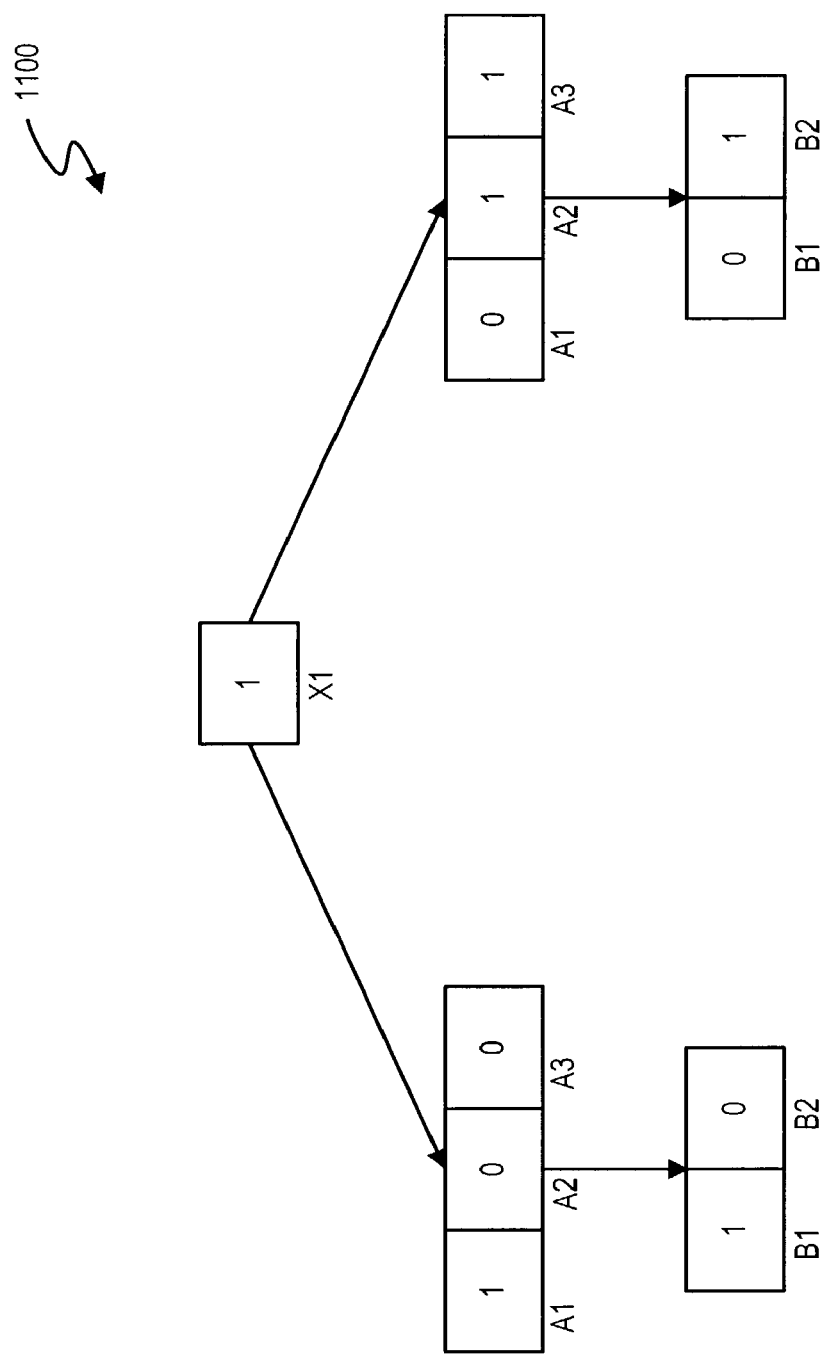
FIG. 14 depicts a trie data structure in its minimized form with associated binary values.

In one embodiment the minimization operation compares corresponding bits in each sub-branch of trie 1100's binary form beginning with siblings of the first level and proceeding downward through the levels until the leaf level is reached. For example, the first level in trie 1100 corresponds to the A family, thus, the binary forms of the sub-branches of each feature in the A family are compared. The A1 sub-branch is 100, the A2 sub-branch is 010, and the A3 sub-branch is 010. The A2 and A3 sub-branches are identical, thus A2 and A3 are combined as depicted in FIG. 13. FIG. 14 depicts trie 1100 in its minimized form with associated binary values.

Figure 15:
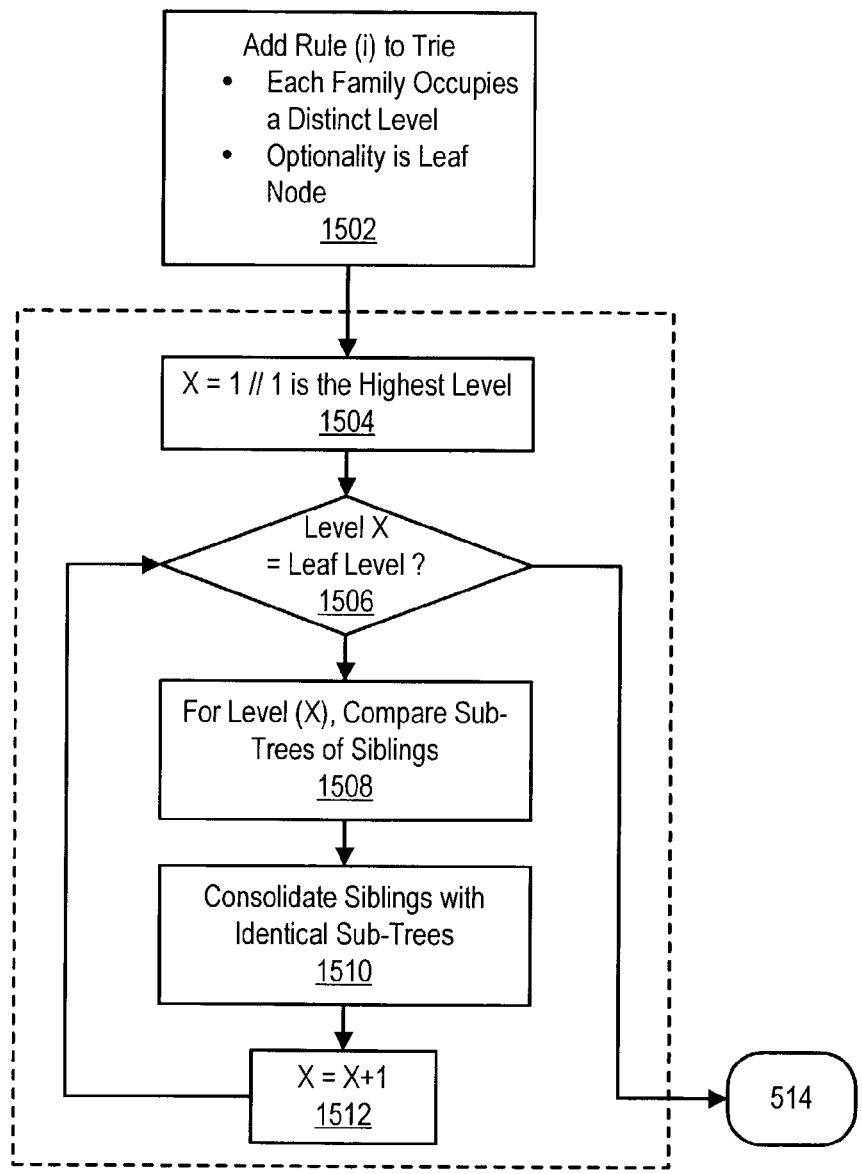
FIG. 15 depicts a trie data structure minimization process.

FIG. 15 depicts one embodiment of operation 512 to minimize the representation of configuration space 608 by creating a new or modifying an existing trie and then performing minimization processes as previously described. For a new trie or an existing trie, operation 1502 adds each rule to the trie. so that the trie represents the current rules to be represented by configuration space 608. As described above, in one embodiment, each family occupies a distinct level in the trie and optionalities are leaf nodes. Operations 1504-1512 minimize the trie representation of the rules as described above. Operation 1504 initializes a count variable, X, to 1, where X represents the level of the trie being analyzed and "1" is the highest level ("//" represents the beginning of a comment). In operation 1506, when X represents the leaf level, no sub-tries are available to analyze and process 500 proceeds to operation 514. If X is not a leaf level, then operation 1508 compares sub-trees of the children of all siblings of level X. Operation 1510 consolidates all siblings whose sub-trees are identical so that they branch from a single root, as described above. Operation 1512 increments X by 1 so that any additional, nonleaf levels can be analyzed for minimization pursuant to operations 1508-1510.

It will be understood by those of ordinary skill in the art that other interfaces can be used to create rules that can be transformed into configuration spaces. It will also be clear to those of ordinary skill in the art that existing configuration models can be displayed using configuration spaces by performing operations 502-520 on an existing configuration model.

Figure 16:
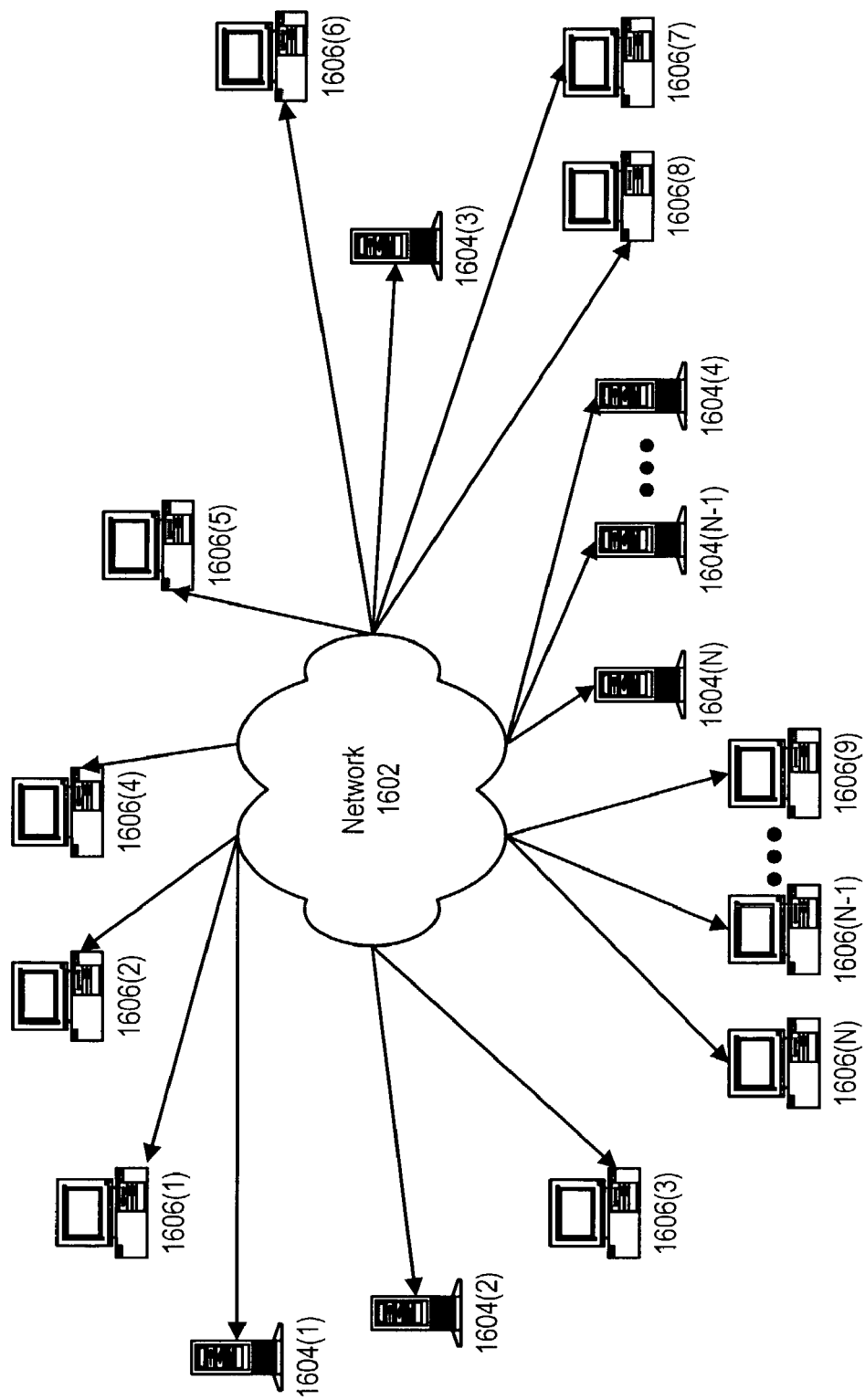
FIG. 16 depicts a block diagram depicting a network environment in which a configuration space system may be practiced.

FIG. 16 is a block diagram depicting one embodiment of a network environment in which a configuration space system 302 may be practiced. Network 1602 (e.g. a private wide area network (WAN) or the Internet) includes a number of networked server computer systems 1604(1)-(N) that are accessible by client computer systems 1606(1)-(N), where N is the number of server computer systems connected to the network. Communication between client computer systems 1606(1)-(N) and server computer systems 1604(1)-(N) typically occurs over a network, such as a public switched telephone network over asynchronous digital subscriber line (ADSL) telephone lines or high-bandwidth trunks, for example communications channels providing T1 or OC3 service. Client computer systems 1606(1)-(N) typically access server computer systems 1604(1)-(N) through a service provider, e.g., an Internet service provider such as America On-Line™ and the like, by executing application specific software, commonly referred to as a browser, on one of client computer systems 1606(1)-(N).

Client computer systems 1606(1)-(N) and/or server computer systems 1604(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 17.

Figure 17:
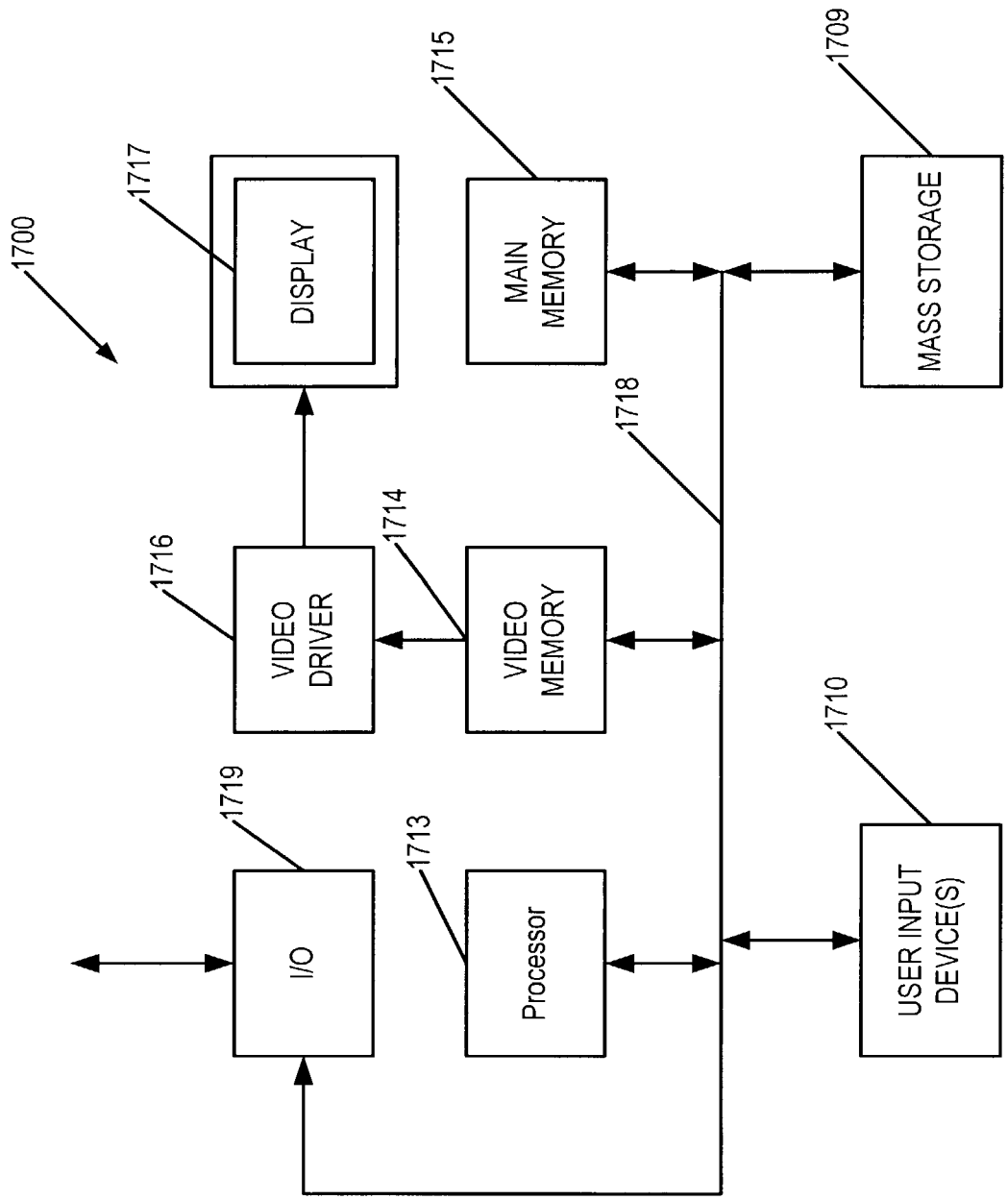
FIG. 17 depicts a computer system.

Embodiments of the configuration space system 302 can be implemented on a computer system such as a general-purpose computer 1700 depicted in FIG. 17. Input user device(s) 1710, such as a keyboard and/or mouse, are coupled to a bi-directional system bus 1718. The input user device(s) 1710 are for introducing user input to the computer system and communicating that user input to processor 1713. The computer system of FIG. 17 also includes a video memory 1714, main memory 1715 and mass storage 1709, all coupled to bi-directional system bus 1718 along with input user device (s) 1710 and processor 1713. The mass storage 1709 may include both fixed and removable media, such as other available mass storage technology. Bus 1718 may contain, for example, 32 address lines for addressing video memory 1714 or main memory 1715. The system bus 1718 also includes, for example, an n-bit DATA bus for transferring DATA between and among the components, such as CPU 1709, main memory 1715, video memory 1714 and mass storage 1709, where "n" is, for example, 32 or 64. Alternatively, multiplex DATA/address lines may be used instead of separate DATA and address lines.

I/O device(s) 1719 may provide connections to peripheral devices, such as a printer, and may also provide a direct connection to a remote server computer systems via a telephone link or to the Internet via an internet service provider (ISP). I/O device(s) 1719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1709 until loaded into main memory 1715 for execution. Computer programs may also be in the form of electronic signals modulated in accordance with the computer program and data communication technology when transferred via a network. The method and functions relating to configuration space system 302 may be implemented in a computer program alone or in conjunction with hardware.

The processor 1713, in one embodiment, is a 32-bit microprocessor manufactured by Motorola, such as the 680160 processor or microprocessor manufactured by Intel, such as the 801686, or Pentium processor. However, any other suitable single or multiple microprocessors or microcomputers may be utilized. Main memory 1715 is comprised of dynamic random access memory (DRAM). Video memory 1714 is a dual-ported video random access memory. One port of the video memory 1714 is coupled to video amplifier 1716. The video amplifier 1716 is used to drive the display 1717. Video amplifier 1716 is well known in the art and may be implemented by any suitable means. This circuitry converts pixel DATA stored in video memory 1714 to a raster signal suitable for use by display 1717. Display 1717 is a type of monitor suitable for displaying graphic images.

The computer system described above is for purposes of example only. The configuration space system 302 may be implemented in any type of computer system or programming or processing environment. It is contemplated that the configuration space system 302 might be run on a stand-alone computer system, such as the one described above. The configuration space system 302 might also be run from a server computer systems system that can be accessed by a plurality of client computer systems interconnected over an intranet network. Finally, the configuration space system 302 may be run from a server computer systems that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of displaying configuration relationships of a product wherein families of product features are related to each other through dependencies, the method comprising:
   selecting one of the product features;
   for each family of product features, determining which of the selected product features have common child dependencies; and
   displaying representations of the product features of one or more of the families that relate to the selected product feature, wherein the product features of a family that have common child dependencies are consolidated into a single representation.

2. The method of claim 1 further comprising displaying a representation of the selected product feature, wherein displaying representations of the product features including the selected product feature comprises:
   displaying a table representing dependency paths containing the selected product feature, wherein the table comprises:
      a family row for each of the families that related to the selected product feature;
      a selected feature row for the selected product feature; and
      cells in each family row for each representation of a displayed product feature.

3. The method of claim 2 wherein the table comprises:
   cells in the selected feature row populated with optionalities for each dependency path represented by the table.

4. The method of claim 1 wherein the consolidated product features are polar sets.

5. The method of claim 1 further comprising:
   ordering families of the represented product features so as to minimize the number of dependency paths displayed.

6. The method of claim 1 further comprising:
   generating a trie that represents the dependencies between the product features of one or more of the families that relate to the selected product feature and the selected product feature.

7. The method of claim 1 wherein the product is a member of the group comprising vehicles, computers, financial services products, pharmaceutical products, construction industry products, and telecommunications products.

8. The method of claim 1 wherein the dependencies are associated with rules governing the configuration relationships of the product, the method further comprising:
   modifying the rules governing the configuration relationships of the product;
   redisplaying the representations of the product features in accordance with the modified rules.

9. The method of claim 8 further comprising:
   generating a trie that represents the dependencies associated with the rules between the product features of one or more of the families that relate to the selected product feature and the selected product feature;
   wherein redisplaying the representations of the product features in accordance with the rules further comprises:

redisplaying the representations in accordance with the generated trie.

10. The method of claim 1 where displaying representations of the product features further comprises:
displaying the representations of the product features in a hierarchical display so as to minimize the number of dependency paths displayed.

11. A method of modeling a configuration of a product, wherein the product includes families of features, the method comprising:
selecting a feature of the product;
selecting one or more additional features of the product;
associating the additional features with the selected feature using one or more configuration rules;
for each family of product features, determining which of the selected product features have common child dependencies; and
displaying a representation of the additional features organized in accordance with the configuration rules, wherein the additional features are grouped by family and organized into dependency relationships in accordance with the configuration rules, and additional features belonging to a common family and having common child-dependency paths are consolidated into respective feature superset representations.

12. The method of claim 11 wherein displaying the representation of additional features further comprises:
displaying the representation of additional features as a hierarchy with each family represented by a distinct level in the hierarchy and each feature and feature superset representation represented by respective nodes in the hierarchy.

13. The method of claim 12 wherein each configuration rule includes an optionality and displaying the representation of additional features further comprises:
displaying optionalities at a leaf level of the hierarchy.

14. The method of claim 11 further comprising:
associating further additional features with the selected feature using one or more additional configuration rules.

15. The method of claim 11 further comprising:
generating a trie data structure in accordance with the configuration rules.

16. The method of claim 15 further comprising:
using a binary form of the trie data structure to consolidate the additional features belonging to a common family and having common child-dependency paths.

17. The method of claim 11 wherein displaying the representation of additional features further comprises:
ordering families in accordance with the frequency that a representative feature of a family is contained by the collective configuration rules.

18. The method of claim 11 wherein the product is a member of the group comprising vehicles, computers, financial services products, and telecommunications products.

19. An apparatus comprising one more storage devices having stored therein:
a model, accessible by one or more processors, having a plurality of configuration rules, wherein each configuration rule relates a selected feature of a product to one or more additional features of the product via an optionality, wherein the product includes multiple families of features; and
a processing engine, executable by the one or more processors, to determine common child dependencies in dependency paths among the additional features and to display a representation of the additional features by family, wherein the product features of a family that have common child dependencies are consolidated into a single representation.

20. The apparatus of claim 19 wherein the one or more storage devices further store:
a trie data structure having levels and nodes to represent the features in the configuration rules, wherein each family is represented in a distinct level of the trie data structure and each respective feature representation is represented by a single node.

21. The apparatus of claim 20 wherein the trie data structure is represented in binary form.

22. The apparatus of claim 20 wherein the processing engine includes a minimizing module to minimize a number of nodes in the hierarchical representation of the additional features so as to maximize consolidation features having common child dependencies.

23. The apparatus of claim 19 wherein each configuration rule includes a left hand side, a right hand side, and an optionality relating the left hand side to the right hand side.

24. The apparatus of claim 23 wherein the left hand side of each configuration rule represents the selected feature.

25. The apparatus of claim 23 wherein the representation of the additional features is organized into levels with each family assigned to a distinct level and levels are arranged in descending order with a highest level being associated with the family having features occurring most often on the right hand side of the configuration rules.

26. The apparatus of claim 23 wherein optionalities include mandatory, standard, optional, restrictive, and no rule.

27. A computer readable medium comprising computer readable instructions stored therein and executable by one or more processors for:
selecting one of the product features;
for each family of product features, determining which of the selected product features have common child dependencies; and
displaying representations of the product features of one or more of the families that relate to the selected product feature, wherein the product features of a family that have common child dependencies are consolidated into a single representation.

28. An apparatus comprising:
means for selecting one of a plurality of product features, wherein families of product features are related to each other through dependencies;
means for determining, for each family of product features, which of the selected product features have common child dependencies; and
means for displaying representations of the product features of one or more of the families that relate to the selected product feature, wherein the product features of a family that have common child dependencies are consolidated into a single representation.

29. An apparatus comprising:
means for selecting a feature of a product, wherein the product includes families of features;
means for selecting one or more additional features of the product;
means for associating the additional features with the selected feature using one or more configuration rules;
means for determining, for each family of product features, which of the selected features of the product have common child-dependency paths; and means for displaying a representation of the additional features organized in accordance with the configuration rules, wherein the additional features are grouped by family and organized into dependency relationships in accordance with the configuration rules, and additional features belonging to a common family and having common child-dependency paths are consolidated into respective feature superset representations.

* * * * *